United States Patent [19]

Meyer

[11] Patent Number: 4,462,692
[45] Date of Patent: Jul. 31, 1984

[54] SCREW EXTRUDERS

[75] Inventor: Paul Meyer, Wiesbaden, Fed. Rep. of Germany

[73] Assignee: Frenkel C-D Aktiengesellschaft, Vaduz, Liechtenstein

[21] Appl. No.: 490,647

[22] Filed: May 2, 1983

[30] Foreign Application Priority Data

Nov. 27, 1982 [GB] United Kingdom ............... 8233890

[51] Int. Cl.³ .............................................. B29B 1/06
[52] U.S. Cl. ...................................... 366/89; 366/79; 366/305; 366/307
[58] Field of Search ........................ 366/79, 80, 88, 89, 366/305, 307, 318, 323; 425/207, 208, 209; 159/2 E

[56] References Cited

U.S. PATENT DOCUMENTS

| | | | |
|---|---|---|---|
| 2,910,726 | 11/1959 | Parshall et al. | 425/208 X |
| 3,398,430 | 8/1968 | Miller | 425/209 |
| 4,075,712 | 2/1978 | Geyer | 366/80 X |
| 4,171,196 | 10/1979 | Maillefer | 425/208 X |
| 4,249,877 | 2/1981 | Machen | 425/208 X |

FOREIGN PATENT DOCUMENTS 2214715 10/1973 Fed. Rep. of Germany ...... 425/208

Primary Examiner—Philip R. Coe
Attorney, Agent, or Firm—Jack Posin

[57] ABSTRACT

An extrusion apparatus having a barrel and a rotatable threaded screw coaxially positioned therein is disclosed. The apparatus includes an upstream inlet section having an opening therein for receiving material to be processed by the apparatus, a compression section downstream of the inlet section, and a mixing or plasticizing section downstream of the compression section. The interior surface of the barrel is provided with an undercut therein which intercommunicates the feed opening with the compression section and has a portion thereof which extends downstream in the compression section about the interior surface of the barrel with a continuously decreasing cross-sectional area. The undercut may be formed in a cylindrical insert carried within the barrel and, in an alternate embodiment, a second undercut cylindrical insert positioned about the first insert and rotatable relative thereto may be employed to vary the cross-sectional area of the undercut.

21 Claims, 6 Drawing Figures

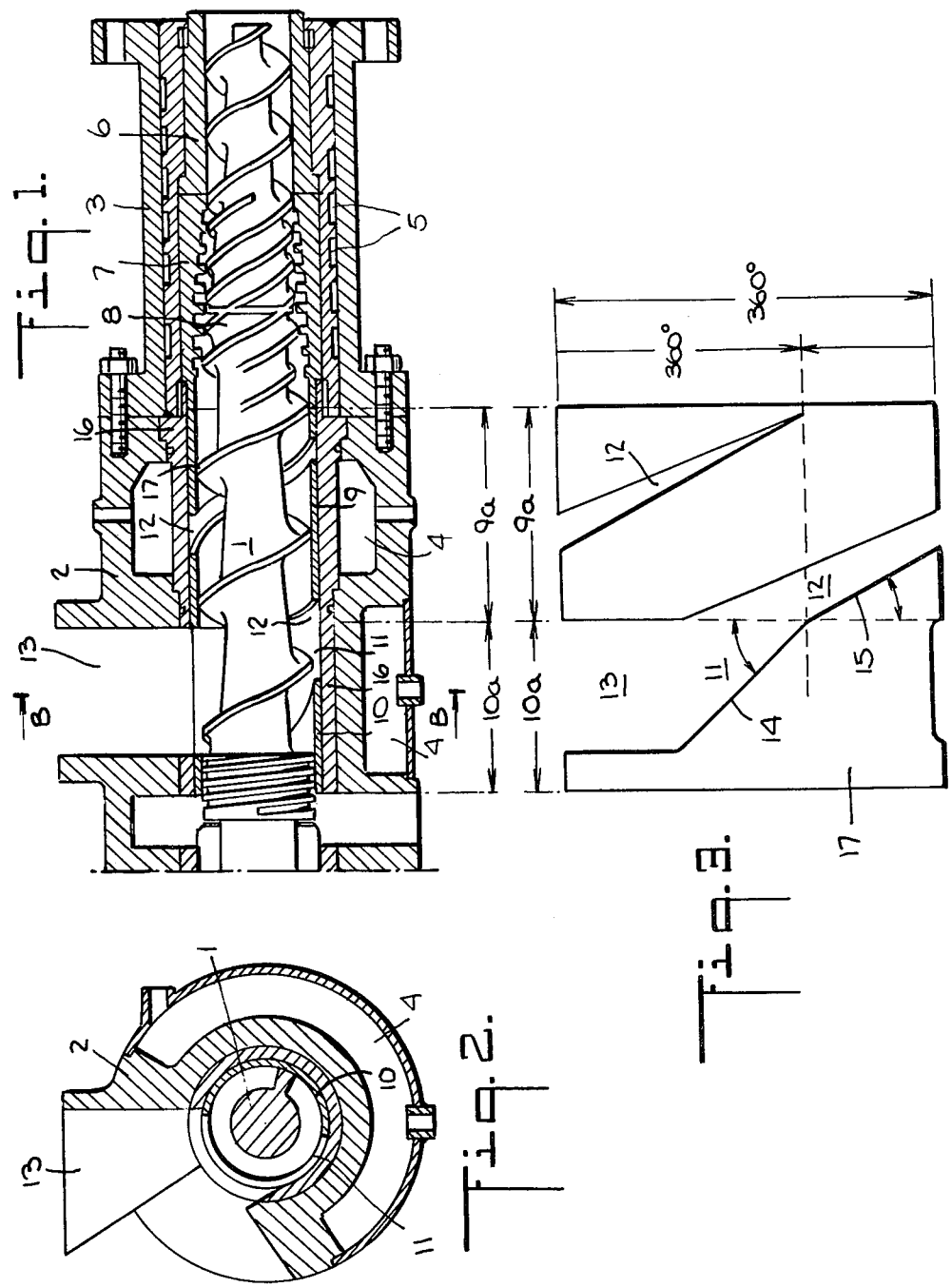

SCREW EXTRUDERS

This invention relates to extruders and, more particularly, to improvements in the inlet/compression sections of extruders, mainly of the single-screw type.

The development of single-screw plastics and rubber extruders, especially of the cold-feed variety, has led to the provision, following a feed-inlet, of a compression zone in which a considerable pressure is built up. This is done by inducing a pumping action on the as yet unplasticized or unmolten material which is moving therethrough in "plug-flow" form, or nearly so, with the object of overriding possible pressure drops in following plasticizing or melting (mixing) zones or, where no degassing is involved, overcoming the resistances of different dies. In this manner considerably higher and also less die-dependent and more stable levels of output are achieved for a given size of extruder.

Different screw designs are known for achieving those effects in the compression zones, and the barrels of such extruders may also feature longitudinal fluting or different kinds of grooving, as well as temperature control, to aid in achieving the pressure build-up.

Furthermore, inlet/compression sections of single-screw extruders are known wherein the barrel is provided with a feed pocket or an "undercut" adjacent to the screw. The undercut generally starts with a diameter somewhat larger than the diameter of the "envelope" of the screw and the undercut diameter decreases to the envelope diameter during a partial wrap around the screw. Such an undercut may be in the inlet opening only, with a smooth transition to the cylindrical barrel at the start of the compression zone. Alternatively, such an undercut may extend around the screw, as a partial spiral of opposite hand to the helix of the screw, entering into the compression zone and aiding the movement of feed material into this zone. Insofar, however, that a pressure build-up of the feed is required, this is generally left to the action of the screw within the smooth or fluted bore barrel. Such undercuts are conceived to and act as flow aids for the feed in and from the inlet, and are not known to extend more than about 180° around the screw in the compression section itself.

Where different materials, e.g. different rubber compounds or different plastics, requiring different pressure build-ups or other effects are required to be processed by the known extruders, it has been necessary to accept considerable variations in output or, in extreme cases, changes of screws have been required.

Also, with the feature of pressure build-up in the almost solid state of the feed material, the feed pockets or undercuts have produced unbalanced radial forces on the screw which are a contributory factor to wear of the screw, especially if giving rise to metallic contact possibly in a following section of the screw, even if only intermittently during start-up or transitory states until a satisfactory operational equilibrium has been achieved. Reference is also made to mixer-extruders having a transfermix geometry in which the envelope of the screw in a transfer zone has been made conical in order to permit an adjustment of the shear input by varying the clearance between the screw-helix and the barrel-helix (see, e.g., U.S. Pat. No. 3,102,716 to M. S. Frenkel). In these mixer-extruders this measure has proved only partially effective because together with, for instance, an opening of the clearance to reduce the shear-rate there would occur also a reduction in the pressure build-up, causing a reduction in throughput and thereby again an increase in the amount of shearwork.

It is, therefore, an object of this invention to provide a construction of barrel in the compression zone whereby a required pressure build-up can be achieved—in the extreme case with the screw having no features to achieve this effect.

It is a further object of this invention to provide a construction of barrel in which the means for effecting pressure build-up can be easily changed to bring about different levels of pressure, and much more economically than by providing a different screw for this purpose.

It is a still further object of this invention to provide a construction of the barrel in which the compression ratio can be adjusted.

It is yet another object of this invention to reduce out-of-balance radial forces on the screw, thereby eliminating a cause of wear.

It is a further object of this invention to provide, in a transfermix type mixing extruder, a means of pressure build-up independent of the transfer zones so that an adjustment of the clearance in these zones can be effective without reducing the throughput, with the aim of regulating the shear rate as a very sensitive parameter of performance in a transfer zone, particularly the first one, in which the material has its highest viscosity.

In order to achieve these objects, this invention provides for a spiral undercut which extends with continuously reducing cross-sectional area for substantially a complete 360° around the screw between the beginning and the end of the compression section.

In a preferred embodiment of this invention, the undercut is formed in a section of pipe which is inserted into the barrel, the pipe having a spiral undercut cut into it in the form of a slot of continuously reducing width which substantially ends in a point at or shortly before the end of the compression section.

In a further embodiment of this invention, such a pipe section, backed on the outside by an uncut pipe to make it a subassembly fitting the barrel, is made interchangeable with another such subassembly having a cut pipe of different wall thickness to provide a different compression ratio.

In yet a further embodiment of the invention, two or more such pipe sections having similarly shaped cuts and telescoped together are provided in the compression section of the barrel. When the cuts are superimposed upon one another, these provide a large compression ratio and when the cuts are brought progressively out of line by relative rotational motion of the cut pipes, these provide a continuous variation of the compression ratio, to the extreme of a lowest compression ratio provided only by the cut on the innermost pipe section which is adjacent to the screw.

In a variation of the foregoing embodiment of the invention, the innermost spirally cut pipe is preferably a fixed part of the barrel assembly, and an adjacent, intermediate, spirally cut pipe and an outer backing pipe fixed thereto are made rotatable relative to the barrel, to provide such a continuous change of the compression ratio.

Other embodiments are envisaged in which the said rotary adjustment also applies to the part of the undercut located in the inlet section.

Alternative methods of adjustment may involve having the component, e.g. the pipe, whose movement effects the adjustment, be composed of longitudinal segments wholly or in part, and effecting the adjustment of the compression ratio by axial positioning of said segments.

In combination with a transfermix geometry having a conical interface between the screw-component and the barrel-component in at least one transfer zone, any one of the embodiments of this invention will preferably be combined with a device for varying the relative axial positions of such screw-component and barrel-component. In this manner the clearance between the said components can be increased, while the compression section according to this invention by its independent pressure build-up maintains the throughput through the extruder, thereby adjusting the shear-rate as a very sensitive parameter of performance.

The invention will now be described by way of example and in some detail with reference to the accompanying drawings, in which:

FIG. 1 is a sectional elevation view of a rubber extruder, with the screw drawn in full lines, showing a spiral undercut pipe insert in the inlet and compression sections of the extruder, followed by a transfermix plasticizing and mixing section;

FIG. 2 is a cross-sectional view through the casing and screw of FIG. 1, taken along the line B—B;

FIG. 3 is a developed view of the pipe insert in the inlet and compression sections of the extruder, which insert is provided with a 360° spiral undercut in the compression section portion thereof;

Figure 4:
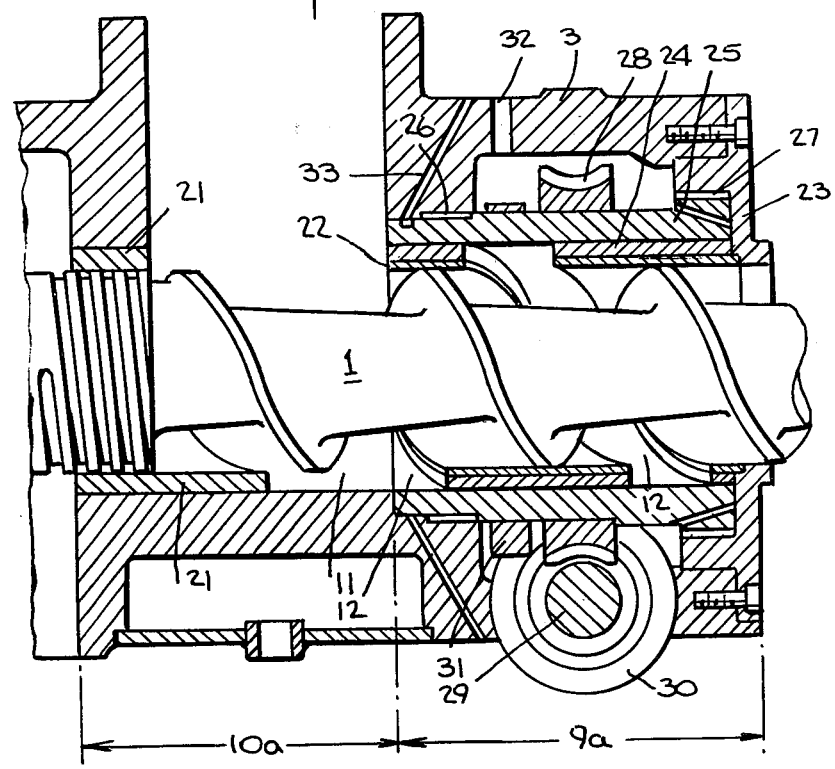
FIG. 4 is a sectional elevation view of the inlet and compression sections of a rubber extruder having a 360° spiral undercut in the compression section, which undercut is adjustable by means of a worm gear.
Figure 5:
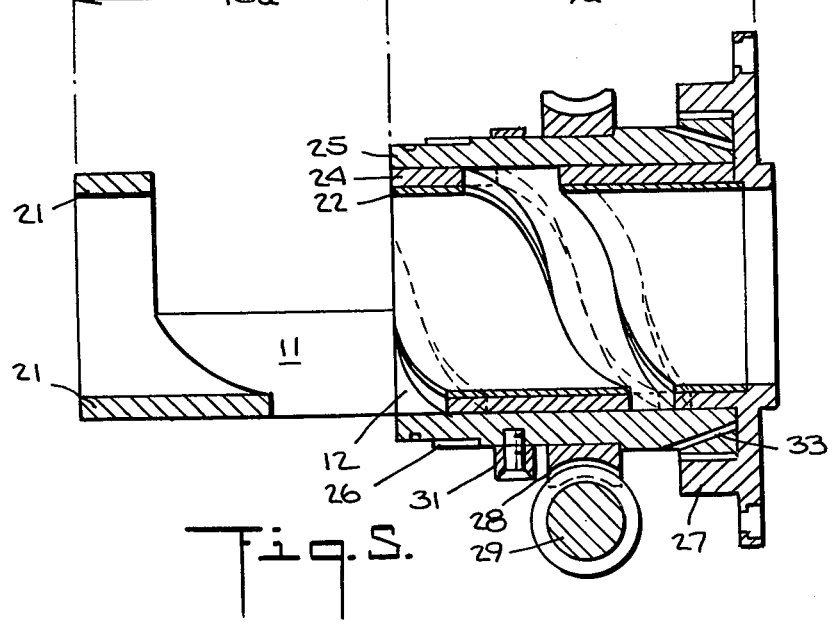
Figure 6:
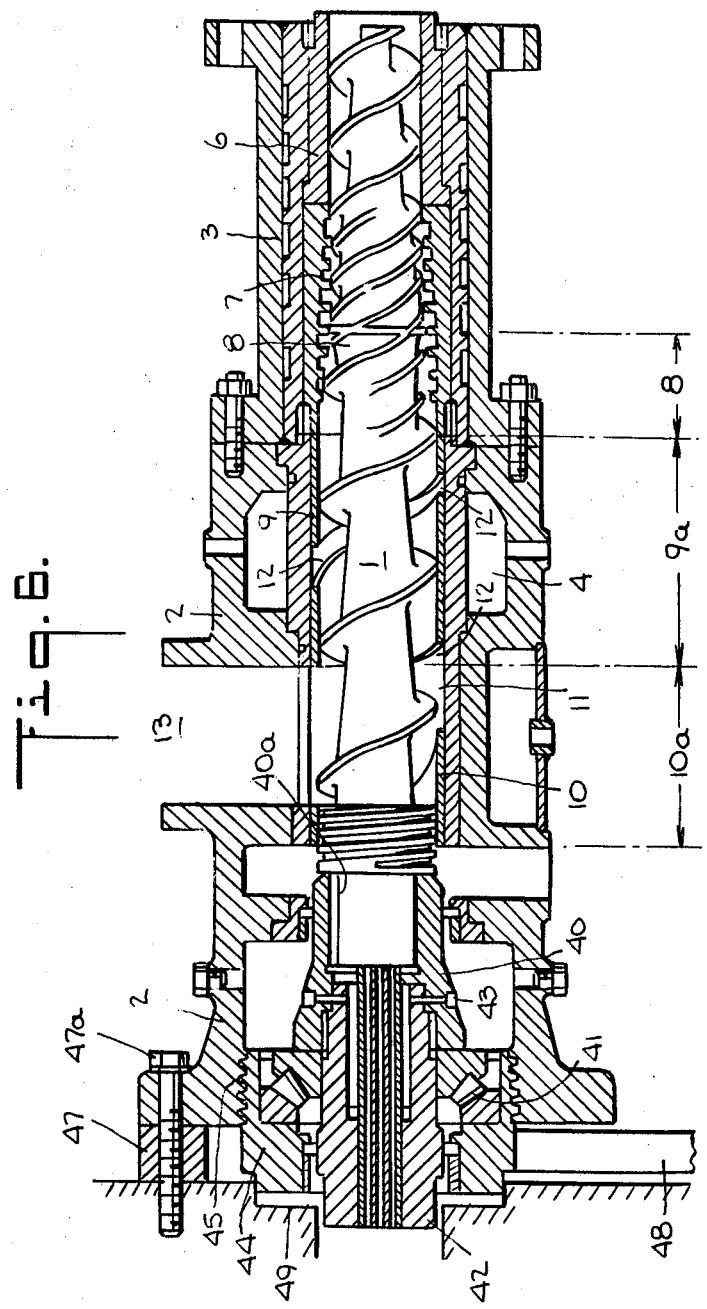

FIG. 5 is an enlarged sectional elevation view of the operative parts of the feed and compression sections of the extruder of FIG. 4, illustrating one extreme and one intermediate position of the adjustable undercut thereof; and, FIG. 6 is a sectional elevation view of an extruder having a fixed spiral undercut according to this invention combined with a device for axially adjusting the position of the screw to vary the clearance in the first transfer zone.

Referring to FIG. 1, an extruder screw 1 is shown unsectioned in a sectioned inlet/compression housing 2 and a sectioned extruder barrel 3. Housing 2 and barrel 3 are provided with passages 4 and 5, respectively, for a heating/cooling fluid. An extrusion head (not shown) or other device may be bolted to a barrel flange at the outlet end of the extruder.

The barrel components adjacent to the screw are formed by sleeves: At the outlet end there is provided a plain cylindrical sleeve 6; upstream of sleeve 6 there is provided a transfermix sleeve 7 which cooperates with a corresponding transfermix section 8 of the screw to form a plasticizing/mixing section or zone 7/8 of the extruder; in the barrel/compression section 2 of the extruder there is a sleeve segment 9; and, under an inlet opening 13, there is a sleeve segment 10. Sleeve segment 9 extends axially through the feed section or zone 9a of the extruder and sleeve segment 10 extends axially through the compression section or zone 10a of the extruder.

It will be understood that the transfermix plasticizing/mixing section 7/8, which is described in greater detail in U.S. Pat. No. 4,136,969 to Paul Meyer, is given here by way of example only. Any other type of plasticizing or mixing screw/barrel assembly, such as a mixer-extruder with a plain barrel (see, e.g., U.S. Pat. No. 3,375,549 to Paul Geyer) or a "pin-type" extruder with pins in the barrel and corresponding circular slots in the screw (see, e.g., U.S. Pat. No. 4,178,104 to Menges et al.) or any other plasticizing or mixing device, all of them requiring longer L/D (length to diameter) ratios than the transfermix, could also be used.

The inlet/compression sleeve segments 9/10 of this invention may be seen in greater detail by reference now to FIGS. 2 and 3, the cross-sectional and developed views respectively, of the present invention.

FIGS. 2 and 3 show a spiral feed pocket 11, communicating with the inlet opening 13 and extending downstream into communication with a spiral undercut 12. The spiral undercut 12 initiates at the upstream end of the compression zone 9a and extends 360° around the screw, and downstream thereof, to a point just before the end of the compression zone. The width of the spiral undercut 12 continuously decreases during its progression downstream to its end point.

The inlet 13 itself may be provided with any one of a number of feed aids (not shown), such as a feed roller, which may be driven or non-driven, or a ram feeder, or with no feed aid device.

A clear distinction is made between the feed pocket 11, which has a spiral leading edge 14 with a lead angle of about 45° for maximum transport effect, and the spiral undercut 12, which has a leading edge 15 with a lesser lead angle—about 33° in this example, based on design considerations—although it may also have the same lead angle as the feed pocket.

Whereas the inlet/compression sleeve 10/9 as fitted into housing 2 appears to be one pipe-like component having the feed pocket 11 and the spiral undercut 12 according to this invention worked into its inner surface, it is made up out of two pipes 16 and 17 fitted into and then fixed to one another. The inner pipe 17 has the shape of the inlet pocket plus the spiral undercut taken out of it, as indicated by the cutout 11–12 on FIG. 3, and the outer pipe 16 is internally cylindrical and serves as a backing to the inner pipe 17.

In operation, the cold feed material, in the form of either a strip, pellets or powder, will be advanced both in the screw and in the barrel by the interlock of the wedge of material in the undercut with the material in the screw. As the undercut is of substantial width, this interlock is fairly strong and will provide a forward motion in a manner approaching "plug-flow" more nearly than the usual "drag-flow" induced by cooling to increase wall friction or by longitudinally arranged flutes or even by narrow helical grooves, which provide much reduced interlock by cutting at each land of the threads forming such grooves. In this way, the spiral undercut makes for a much more effective pressure build-up.

The magnitude of the pressure build-up is established by the ratio of the depth of the undercut to the depth of the helical channel or channels in the screw and, within limits, the pressure build-up will become greater as the undercut becomes deeper.

Since the material being processed is pressed into the screw substantially at all positions round its circumference in the compression zone 9, the resultant radial force on the screw will be much reduced.

Furthermore, an inlet/compression sleeve 10/9 made up of two suitably machined pipes, as described, will be much less expensive to purchase than a different screw. Therefore, the replacement of one such inlet/compression sleeve by another with a different depth of spiral undercut will be less costly than the provision of another screw. Although more assembly work would be involved in such a change on an existing extruder than in changing a screw, this scheme has definite advantages when assembling new extruders from stock items where such a sleeve is a much cheaper item than a different screw.

Moreover, building a compression effect into a screw must inevitably reduce its cross-sectional area of flow and thereby its transport capacity. This is avoided by building the compression into the barrel in accordance with this invention.

As for the functional advantages of a spiral undercut: The use of a feed pocket and a 360° spiral undercut of 6 mm depth on a nominal 3¼" transfermix cold feed extruder similar to that shown in FIG. 1 has resulted in an increase in output for a truck tread compound containing about 20% Natural Rubber from the 400–500 Kg/hr range to a 650 Kg/hr output, with a corresponding reduction in extrudate temperature from about 105° C. to about 80° C., other conditions being kept the same, at the top speed available on the unit. Obviously, at that extrusion temperature a higher speed would have enabled higher outputs to be achieved.

Referring now to FIGS. 4 and 5, there has been illustrated an embodiment of this invention, similar to FIG. 1, in which the spiral undercut in the compression section has been made adjustable. With like numerals indicating like parts to those shown in FIGS. 1–3, the operative parts of this embodiment are a fixed sleeve which comprises a full depth segment 21 in the inlet section 10a and a machined-down segment 22 of reduced depth in the compression section 9a, adjacent to the screw 1. At its downstream end, this machined-down sleeve segment 22 is held in place and secured against rotation by a suitable means (e.g., keyed or dovetailed to an annular recess) in a retaining flange 23 which is bolted to casing 3. This fixed sleeve 21/22 has a feed pocket 11 in its segment 21 which is of full depth, and it has a spiral undercut 12 in its segment 22 the depth of which is about ¼ of the depth of the feed pocket. Radially outwardly of the sleeve segment 22 in the compression section 9a, there is an additional sleeve 24 which has cut into it the balance of the spiral undercut 12 (i.e., the remaining ¾ of the depth of the feed pocket). Sleeve 24 is weld to a full backing sleeve 25. The backing sleeve 25 is rotatable relative to sleeve 21/22 and is mounted in sleeve bearings 26 and 27 set into the casing 3 and the retaining flange 23, respectively.

A worm wheel 28 is fixedly mounted to the outer surface of sleeve 25. Worm wheel 28 cooperates with and may be rotated by a worm gear 29 which is held in bearings 30 in the casing 3. The worm gear 29 is actuated by a hand wheel or other suitable drive so that the sleeves 24/25 can be rotated from outside of the casing. An eccentric band 31 is also fixedly mounted on the outer surface of sleeve 25 so that a feeler (not shown) can be inserted through an opening 32 in the top of casing 3 to monitor the angular position of the sleeves 24/25. Passages 33 are drilled at several positions in backing sleeve 25 and in casing 3 to permit rubber, which may have been squeezed out of the compression zone 9a, to exit without blocking up surfaces where relative motion is required during adjustment. For this purpose also, the casing 3 is left open at the bottom around the worm gear 29 and bearings 30.

Referring in FIG. 5 to the position shown in full lines, the ¼ depth undercut in the fixed sleeve segment 22 and the ¾ depth undercut in the sleeve 24 are shown in congruence so that there is a full depth undercut throughout the compression section 9a. This alignment of the two undercuts is employed when the extruder is used for processing a material requiring a high compression ratio.

When the sleeve 24/25 has been rotated so that the undercut in sleeve 24 is in the intermediate position, as indicated by the broken lines, it will be seen that a substantial amount of the ¾ depth portion of the undercut in sleeve 24 has been blocked off by sleeve segment 22 so that effectively an undercut of much smaller cross-sectional area will be left in the compression zone 9a. In the inlet section 10a, on the other hand, the full depth of the feed pocket 11 remains in operation and this has the effect of increasing the feeding action to insure that the compression section 9a remains well supplied with material being processed.

In operation it has been found that the rubber compound which was extruded at 650 Kg/hr on the fixed undercut embodiment of FIGS. 1-3 could, using the adjustable undercut embodiment of FIGS. 4 and 5, be extruded up to 850 Kg/hr out of the same size extruder, at a lower extrusion temperature with all other operating conditions being as described in connection with the FIGS. 1-3 embodiment. Another compound, which previously could be extruded at 400 Kg/hr in the fixed spiral undercut embodiment, could be extruded at 650 Kg/hr with the adjustable spiral undercut embodiment.

The adjustable spiral undercut can be adjusted to be completely closed so that only the ¼ depth portion in sleeve segment 22 remains. This setting may be used for compounds containing a high proportion of Natural Rubber, which compounds would tend to be underworked if processed at the high throughputs imposed by the full depth undercut.

Referring now to FIG. 6, there is shown a transfermix extruder similar to the one shown in FIG. 1, in which a device for adjusting the axial position of screw 1 is incorporated with an axial thrust bearing assembly. Like numerals in the two figures denote like parts. The screw 1 is mounted in a connecting piece 40 which serves to transmit the axial load on the screw to a tapered roller thrust bearing 41. Connecting piece 40 applies its turning moment to the screw by means of a suitable key and keyway 40a. The connecting piece 40 itself is splined onto on the output shaft 42 of a main reduction gear box (power train) 49 and transmits the torque of the output shaft 42 to the screw 1. Lock screws 43 axially lock the connecting piece 40 to the shaft 42. This shaft itself is mounted in the reduction gear 49 with a sufficient amount of axial play to avoid applying any part of the axial load on the bearings into the reduction gear box. Alternatively, the connecting piece 40 may itself be a shaft which is mounted with axial freedom of motion on a hollow output shaft of the reduction gear box.

The axial thrust 41, in turn, is held by a cup-shaped retainer 44 which is screwed into the casing 2 by means of a suitably dimensioned thread 45. In this manner the axial thrust of the screw is taken up directly by the extruder casing 2 so that the mounting of the extruder assembly only has to take up the weight and the torque transmitted through the rubber by the screw to the casing. The extruder is mounted on a wall of the reduction gear 49 by a spacer ring 47 which has a cut-out portion therein of about 120° at the bottom, as shown, or at the top if desired, and a corresponding partial ring of bolts 47a.

The axial bearing retainer 44 is fitted with an arm 48 which passes through the cut-out portion of the spacer ring 47, and the screw thread 45 is provided with a suitable lead angle so that rotation of the arm 48 through about 100° will provide the axial repositioning required.

For example, with a cone angle of about 8°50' for the conical interface in the first transfer zone 8 and with the screw being originally mounted 1 mm back from metallic contact in this conical section, the radial clearance will be about 0.15 mm. Adjusting the screw 1 mm farther back will double the radial clearance and thereby halve the shear stress on the material being transferred. Withdrawing the screw by 2 mm will reduce this shear stress to one-third.

The arm 48 is releasably secured at its end which is remote from retainer 44, for example by a screw locking device (not shown), so that it can be released, rotated slowly to a selected new position and then relocked to remain fixed in such selected new position.

In practice, the adjustment for halving the shear stress, when used, has proved sufficient to cause a tough compound with a high Natural Rubber content to be extruded with a very flat temperature curve, as shown in the following two test run results:

160 Kg/hr at 36 rpm and 100° C. extrusion temperature; and

620 Kg/hr at 105 rpm and 111° C. extrusion temperature.

The foregoing results indicate that with a further increase in screw speed (which was not possible with the specific drive used), a higher output could have been achieved at a very acceptable extrusion temperature. A temperature of 100° C. was about the minimum temperature this compound required to be extrudable at all. The same tough compound at the unadjusted clearance of 0.15 mm tended to reach a very high extrusion temperature with increasing screw speed—about 130° C. at 86 rpm.

From the foregoing, it will be seen that this invention makes possible effective extrusion systems wherein suitable known process control equipment can be employed to effect very sensitive control over the viscosity, temperature and throughput of material processed therein. This can be done either by adjusting the clearance in the conical transfer zone independently of the throughput, when using the fixed spiral undercut of this invention, or additionally, by adjusting the compression ratio by means of the adjustable spiral undercut herein disclosed. These are quicker acting and more sensitive parameters for influencing extrusion than, for example, changing screw speed, or adjusting a throttle either between the extruder casing and the extrusion head or within the outlet section of the screw, or changing the temperatures of the screw and/or barrel in different sections of the presently known extruders.

While there have been shown and described what are at present considered to be the preferred embodiments of this invention, it will be obvious to those skilled in the art that various changes and modifications may be made therein without departing from the broader aspects of this invention, and it is, therefore, aimed in the appended claims to cover all such changes and modifications as fall within the true spirit and scope of this invention.

Having thus described the invention, what is claimed as new and desired to be secured by Letters Patent of the United States is as follows:

1. An extrusion apparatus having a barrel and a rotatable threaded screw coaxially positioned within said barrel, said apparatus including an upstream inlet section having an opening therein for receiving material to be processed by the apparatus, a compression section downstream of said inlet section, and a mixing or plasticizing section downstream of said compression section, characterized in that the interior surface of said barrel is provided with an undercut therein which intercommunicates said feed opening with said compression section of said extruder, and which undercut includes a portion thereof which extends downstream in said compression section about the interior surface of said barrel with a continuously decreasing cross-sectional area through substantially a complete 360° turn about said screw.

2. An extrusion apparatus as claimed in claim 1 wherein said barrel is provided with a cylindrical insert on its internal surface, which insert extends axially through said inlet section and said compression section, and wherein said undercut is formed on the internal surface of said cylindrical insert.

3. An extrusion apparatus as described in claim 2 wherein said cylindrical insert includes a cut-out therein in radial alignment with said opening in said barrel, and wherein said undercut of said insert communicates with said cut-out thereof.

4. An extrusion apparatus as described in claim 3 wherein said undercut includes a first spiral portion thereof in said inlet section and a second spiral portion thereof in said compression section.

5. An extrusion apparatus as described in claim 4 wherein said first undercut portion has a leading edge which makes an angle of about 45° with a plane that includes the axis of said screw and intersects said leading edge.

6. An extrusion apparatus as described in claim 5 wherein said second undercut portion has a leading edge which is a continuation of the leading edge of said first undercut portion, said leading edge of said second undercut portion making an angle of about 33° with a plane that includes the axis of said screw and intersects said leading edge of said second undercut portion.

7. An extrusion apparatus as described in claim 4 and further including a second cylindrical insert coaxial with and positioned about the portion of said first cylindrical insert in the compression section of said extruder, said second cylindrical insert having an undercut therein corresponding in plan to and in alignment with said second spiral portion of the undercut in said first cylindrical insert, said second cylindrical insert being rotatable relative to said first cylindrical insert.

8. An extrusion apparatus as described in claim 7 and further including adjustment means carried by said barrel and cooperative with said second cylindrical insert for rotating said second cylindrical insert relative to said first cylindrical insert to thereby vary the alignment of the undercuts of said first and second cylindrical inserts and change the compression ratio to be applied to material that is to be processed by said apparatus.

9. An extrusion apparatus as described in claim 8, said apparatus including a third cylindrical insert coaxial with and positioned about said second cylindrical insert, said third cylindrical insert being fixed to and rotatable with said second cylindrical insert, said apparatus further including an eccentric band mounted on the outer surface of said third cylindrical insert and rotatable therewith, and an opening in said the barrel in radial alignment with said band whereby a feeler gage can be inserted through said opening into contact with said band to monitor the rotational alignment of said first and second cylindrical inserts.

10. An extrusion apparatus as described in claim 8 wherein the inner surface of said barrel and the outer surface of said screw in said mixing or plasticizing section are each conical surfaces, said conical surfaces being closely spaced from one another and forming a conical interface between said barrel and said screw in said mixing or plasticizing section, and further including second adjustment means carried by said barrel and engageable with said screw for axially shifting said screw to thereby vary the spacing between the conical inner surface of said barrel and the conical outer surface of said screw.

11. An extrusion apparatus as described in claim 1 wherein the inner surface of said barrel and the outer surface of said screw in said mixing or plasticizing section are each conical surfaces, said conical surfaces being closely spaced from one another and forming a conical interface between said barrel and said screw in said mixing or plasticizing section, and further including adjustment means carried by said barrel and engageable with said screw for axially shifting said screw to thereby vary the spacing between the conical inner surface of said barrel and the conical outer surface of said screw.

12. An extrusion apparatus having a barrel and a rotatable threaded screw coaxially positioned within said barrel, said apparatus including an upstream inlet section having an opening therein for receiving material to be processed by said apparatus, a compression section downstream of said inlet section, and a mixing or plasticizing section downstream of said compression section, characterized in that the interior surface of said barrel is provided with a generally spirally oriented undercut therein which intercommunicates said feed opening with said compression section of said extruder, said undercut including a portion thereof which extends downstream in said compression section with a continuously decreasing cross-sectional area, said apparatus further including adjustment means carried by said barrel and cooperative with said undercut to selectively change the cross-sectional area of said undercut in said compression section thereby to change the compression ratio to be applied to material that is to be processed by said apparatus.

13. An extrusion apparatus as claimed in claim 12 wherein said barrel is provided with a cylindrical insert on its internal surface, which insert extends axially through said inlet section and said compression section, and wherein said undercut is formed on the internal surface of said cylindrical insert.

14. An extrusion apparatus as described in claim 13 wherein said cylindrical insert includes a cut-out therein in radial alignment with said opening in said barrel, and wherein said undercut of said insert communicates with said cut-out thereof.

15. An extrusion apparatus as described in claim 14 wherein said undercut includes a first spiral portion thereof in said inlet section and a second spiral portion thereof in said compression section.

16. An extrusion apparatus as described in claim 15 wherein said first undercut portion has a leading edge which makes an angle of about 45° with a plane that includes the axis of said screw and intersects said leading edge.

17. An extrusion apparatus as described in claim 16 wherein said second undercut portion has a leading edge which is a continuation of the leading edge of said first undercut portion, said leading edge of said section undercut portion making an angle of about 33° with a plane that includes the axis of said screw and intersects said leading edge of said second undercut portion.

18. An extrusion apparatus as described in claim 15 and further including a second cylindrical insert coaxial with and positioned about the portion of said first cylindrical insert in the compression section of said extruder, said second cylindrical insert having an undercut therein corresponding in plan to and in alignment with said second spiral portion of the undercut in said first cylindrical insert, said second cylindrical insert being rotatable relative to said first cylindrical insert.

19. An extrusion apparatus as described in claim 18 wherein said second cylindrical insert is connected to said adjustment means for rotating said second cylindrical insert relative to said first cylindrical insert to thereby vary alignment of the undercuts of said first and second cylindrical inserts and change the compression ratio to be applied to material that is to be processed by said apparatus.

20. An extrusion apparatus as described in claim 19, said apparatus including a third cylindrical insert coaxial with and positioned about said second cylindrical insert, said third cylindrical insert being fixed to and rotatable with said second cylindrical insert, said apparatus further including an eccentric band mounted on the outer surface of said third cylindrical insert and rotatable therewith, and an opening in said barrel in radial alignment with said band whereby a feeler gage can be inserted through said opening into contact with said band to monitor the rotational alignment of said first and second cylindrical inserts.

21. An extrusion apparatus as described in claim 19 wherein the inner surface of said barrel and the outer surface of said screw in said mixing or plasticizing section are each conical surfaces, said conical surfaces being closely spaced from one another and forming a conical interface between said barrel and said screw in said mixing or plasticizing section, and further including second adjustment means carried by said barrel and engageable with said screw for axially shifting said screw to thereby vary the spacing between the conical inner surface of said barrel and the conical outer surface of said screw.

* * * * *